No. 804,852. PATENTED NOV. 21, 1905.
C. L. IRESON.
RESILIENT TIRE.
APPLICATION FILED MAR. 15, 1905.
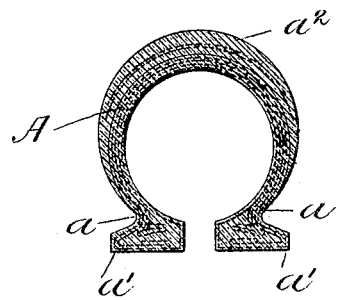
Fig. 1.
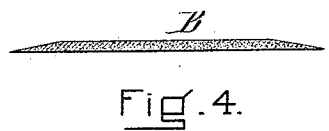
Fig. 4.
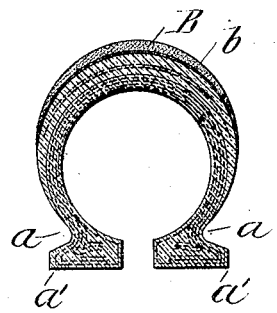
Fig. 2.
Fig. 5.
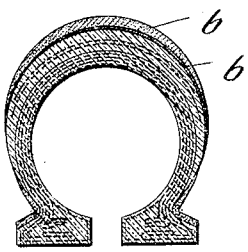
Fig. 3.
WITNESSES:
R. E. Brown
M. V. Foley
INVENTOR:
Charles L. Ireson

UNITED STATES PATENT OFFICE.

CHARLES L. IRESON, OF BOSTON, MASSACHUSETTS.

RESILIENT TIRE.

No. 804,852.     Specification of Letters Patent.     Patented Nov. 21, 1905.

Application filed March 15, 1905. Serial No. 250,187.

*To all whom it may concern:*

Be it known that I, CHARLES L. IRESON, a citizen of the United States, residing at Boston, in the county of Suffolk and State of Massachusetts, have invented a new and useful Improvement in Resilient Tires for Motors and other Vehicles, of which the following is a full, clear, and exact description, reference being had to the accompanying drawings, forming a part of this specification, in explaining its nature.

Tires for automobiles and other vehicles as now commonly made usually employ rubber or rubber compound for a wearing-surface. The tire may be what is known as "solid" or it may be of the kind known as "pneumatic." In both kinds rubber forms the exterior surface, and, while it answers many purposes exceedingly well and may almost be said to be an essential element in tires of the present type, it has some defects which are of common knowledge and which it is the purpose of my invention to remedy or modify.

I would say that my invention is perhaps better adapted as a whole to the pneumatic form of tire; but as applied to both its office is to protect the rubber from the wear of attrition and to also provide a surface for the tire which shall modify the tendency of the vehicle to "skid" under certain conditions of use.

It is further desirable for preventing the puncturing or cutting of the tire and the protection of the rubber of the tire from undue heat and from oils, acids, alkalis, or other elements tending to injuriously affect it.

My invention is further applicable to the protection of such tires from wear wherever such wear may be detrimental to the tire.

It consists in the application to the tire in a special way of wearing or protecting sections of leather or leather pads or leather wearing-sections.

Before describing the method of combining the leather sections with the remainder of the tire I would say that I prefer to employ a form of leather which is close-grained, long-fibered, and is tough, flexible, and somewhat resilient. Such a leather is produced by my tannery and is known as "anhydrous" leather and is used by me in the manufacture of a superior quality of leather belting. A leather having these characteristics is desirable, although not absolutely essential. It is desirable because it possesses greater wearing properties, is conformable with the yielding movements of the tire with which it is united and forms a part, its toughness better resists puncturing and cutting, and its fibrous and dense quality and method of tannage enable it to be readily combined with the remainder of the tire in the way I am about to describe. Such a leather should be free from such oils or other elements as are injurious to rubber.

The leather is united to the tire to form a part thereof either during the original manufacture of the tire or afterward, as may be desired, and it is applied to any part of the tire which may require protection. The two principal parts of the tire requiring such protection are the tread of the tire and the neck of the tire, against which the flanges of the wheel-rim bear. The leather is combined with the tire to form a practically homogeneous part of it by means which become integral with the tire itself and which do away with the employment of a rubber-cement or of stitching, which are not desirable ways of attachment.

In making the tire the rubber surface of the tire to which the leather wearing section or sections are to be secured is preferably somewhat roughened by rasping or in any other desired way. To this roughened surface is applied one or more coatings of a rubber-cement. There is also applied to the inner surface of the leather, which may be roughened, if desired, one or more coatings of rubber-cement, and between the two there is employed a thin, intermediate, uniting-section of a vulcanizable compound which is of the size of the leather to be united to the tire and which vulcanizable compound is caused to unite with the rubber of the tire and with the leather under pressure and under heat. The pressure employed is sufficient to firmly hold the leather upon the tire. The heat which is used is sufficient to cause vulcanization, but not sufficient to injure the leather. If desired, the leather may be protected from the heat of vulcanization while the heat is present. This is necessary where wet vulcanization is employed and the leather is of a character to be injured by moisture. The time during which heat is used may vary, but is usually in the neighborhood of thirty to fifty minutes.

The leather thus prepared and combined with the remainder of the tire is permanently united to it by a bond which forms an integral part of the tire, of the rubber, and of the leather, and no other means for securing the leather to the tire is necessary. The leather sections of the tire may be of any length. For use as a tread-surface, short lengths, the edges of which abut, are desirable.

It is not essential that the rubber-cement be applied to either the surface of the vulcanized rubber or to the surface of the leather, and whether or not it is employed will depend somewhat on the character and condition of the vulcanized rubber and the character and condition of the leather. The essential feature of the invention is the use and employment between the leather section and the vulcanized-rubber section of the tire of a previously-prepared vulcanizable bond of unvulcanized rubber and a vulcanizing agent. These elements should be embodied together into the form of a sheet, and the sheet should have the dimensions in length and width of the leather to be united. The vulcanizing agent may be sulfur or any other desired agent. In use this uniting bond or sheet of vulcanizable compound may be first temporarily attached to the leather surface, or it may be temporarily attached to the surface of the vulcanized rubber, or it may be free between the two, although it will be confined between them during the vulcanization by the pressure which must always be used to hold the leather and the vulcanized rubber firmly together during the vulcanization. This is necessary in order that the vulcanizing sheet or bond may be so compressed during vulcanization that it will not only completely fill all the voids between the leather and the vulcanizing agent, but will also be caused to enter the pores of the leather, and thus become a part of the leather mechanically as well as chemically.

The employment of a vulcanizing agent in the leather, such as sulfur, introduced in it either during and by the act of tanning or specially, is not objectionable and in some instances is desirable because it assists in this chemical union of the vulcanizable rubber sheet with the leather to which I have referred.

I will now describe the invention in conjunction with the drawings forming a part of this specification, wherein—

Figure 1 is a view in cross-section of a portion of a pneumatic rubber tire before a leather tread or wearing section has been added to it. Fig. 2 is a view in cross-section of the complete tire without the inflated inner tube, showing a leather tread or wearing section as attached to the tire to become a permanent part thereof, the sheet of vulcanizable stock used for establishing the bond being represented as incorporated with the previously-vulcanized rubber and with the leather. Fig. 3 is also a view in cross-section showing the tire of Fig. 2 with wearing-sections of leather vulcanized by the means above specified to the neck of the tire. Fig. 4 represents a leather tread before vulcanization, and Fig. 5 a separate intermediate bonding-sheet of vulcanizable rubber compound.

In the drawings the tire A is a cross-section of a pneumatic tire. It has the neck $a$, the flanges $a'$, and the tread $a^2$. (See Fig. 1.) In Fig. 2 the tire is represented as completed by the combination therewith of the leather tread or wearing sections B, which when united to the vulcanized rubber $b$ of the tire, as I have described, form integral and substantially homogeneous parts of the tire.

In Fig. 4 I have represented in section a leather tread B. Of course these wearing-sections of leather may be short, as therein represented, or they may be of any length, or they may completely envelop the tire without joints between them, if desired, in which case, of course, the leather wearing-surface will be made up of a number of sections of leather which would overlap at their joints.

In Fig. 5 I have shown in section the sheet of vulcanizing rubber or compound which is used between the leather tread or wearing section and the vulcanized rubber of the remainder of the tire.

I will here say that not only may the leather treads or wearing-sections be united to the vulcanized rubber originally, but the tire may at any time be readily repaired by the removal of the worn leather treads or sections and the substitution therefor of new ones in the same manner as herein specified, or the worn leather treads or sections may themselves be covered by new leather sections or treads united to the first, as herein described—viz., by the interposition of the sheet of vulcanizable compound and the vulcanization of the repairing sections or treads to the old ones of the tire under heat and pressure, as I have above set forth.

In Fig. 3 I have shown the tire as having leather protecting-sections at the neck, which are united to the vulcanized rubber of the neck to form integral and homogeneous parts thereof and which serve to protect the neck from wear and to increase the strength and life of that part of the tire.

Having thus fully described my invention, I claim and desire to secure by Letters Patent of the United States—

1. A resilient tire for motor or other vehicles mainly composed of vulcanized rubber or rubber stock, a leather wearing section or tread to said tire, and a uniting-bond of vulcanized rubber stock interposed between the rubber and leather.

2. A resilient tire for motor or other vehicles mainly composed of vulcanized rubber or rubber stock, a leather wearing section or tread to said tire, and for uniting the leather wearing-section to the tire, a thin uniting section or sheet of vulcanizable rubber interposed between the same and adhering to both when vulcanized.

3. A resilient tire for motor and other vehicles mainly composed of vulcanized rubber or rubber stock, leather wearing sections or treads, and an interposed, uniting-bond of vulcanizable rubber stock between the leather and the vulcanized rubber and united to both and uniting both under pressure by heat and vulcanization.

CHARLES L. IRESON.

Witnesses:
F. F. RAYMOND, 2d,
M. V. FOLEY.